May 9, 1933.  R. S. SANFORD  1,908,451
BRAKE MECHANISM
Filed April 27, 1929

INVENTOR
Roy S. Sanford
BY
M. W. McConkey
ATTORNEY

Patented May 9, 1933

1,908,451

UNITED STATES PATENT OFFICE

ROY S. SANFORD, OF SOUTH BEND, INDIANA, ASSIGNOR TO BENDIX BRAKE COMPANY, OF SOUTH BEND, INDIANA, A CORPORATION OF ILLINOIS

BRAKE MECHANISM

Application filed April 27, 1929. Serial No. 358,488.

This invention relates to brakes, and is illustrated as embodied in novel operating mechanism for front automobile brakes. An object of the invention is to simplify the operating mechanism, by utilizing a flexible Bowden conduit which is shifted lengthwise of its cable or equivalent tension element to apply the brake. Preferably the tension element is held at its ends, being secured to two opposite brakes, or having one end secured to the brake and the other to the chassis frame, and the conduit for each brake is slidably mounted thereon in engagement with a cam lever or an equivalent brake-applying device.

The above and other objects and features of the invention, including various novel and desirable structural arragements will be apparent from the following description of the illustrative embodiments shown in the accompanying drawing, in which.

Figure 1:
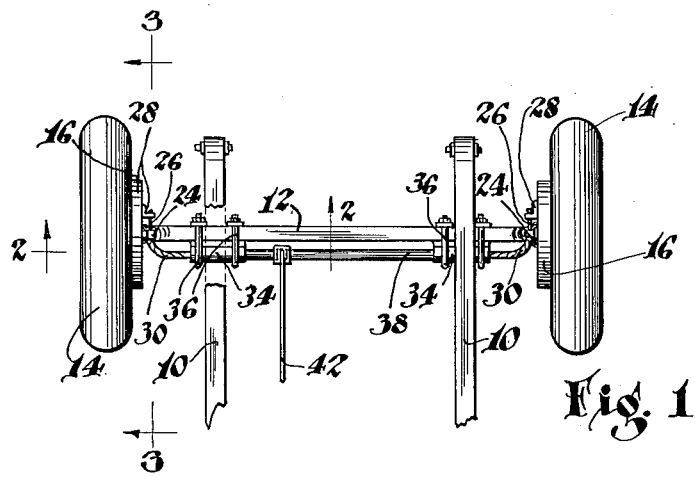
Figure 1 is a top plan view of the front part of an automobile chassis, showing the novel operating mechanism connecting the front brakes.

The chassis illustrated includes the usual frame 10, supported by suitable springs on a front axle 12 and a rear axle (not shown) carried by road wheels 14 having brakes 16. Each brake may be provided, at the open side of the brake drum, with a suitable support such as a backing plate 18 carrying the friction means of the brake, and preferably supporting also an applying device such as a brake-applying cam 20 provided with a camshaft 22 having an operating crank arm or lever 24, on the outside of the backing plate in this particular arrangement.

A cable 26, or an equivalent flexible tension element, is fixedly secured at its ends to the two brakes, for example by having enlarged or headed ends seated against projections such as stamped brackets 28 secured to the backing plates 18. The central portion of the element extends along the axle 12 and parallel thereto.

The ends of the tension element 26 are housed in flexible conduits 30, of any desired construction so long as they are substantially incompressible lengthwise while yet having sufficient flexibility not to interfere with the swiveling of the wheels. These conduits 30 are slidable lengthwise of the tension element 26, and engage at their outer ends the arms 24 of the brake-applying devices.

Figure 2:
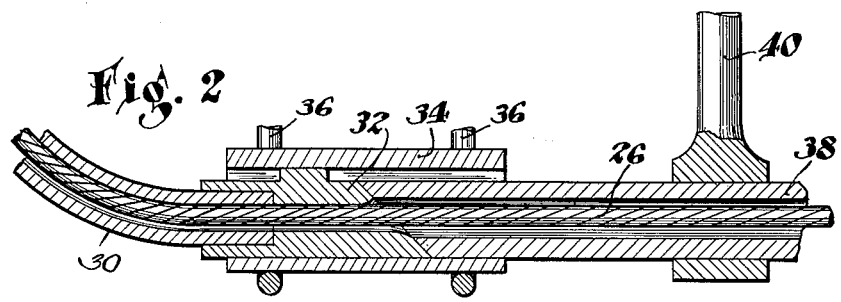
Figure 2 is a partial section on the line 2—2 of Figure 1, showing the means for operating the conduit.
Figure 3:
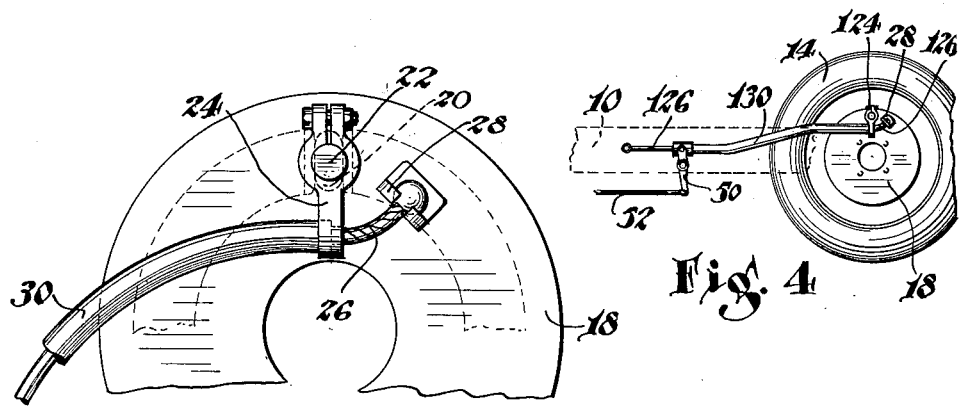
Figure 3 is a partial section on the line 3—3 of Figure 1, showing one of the brakes in elevation.

The inner ends of conduits 30 have fittings 32 slidably arranged in parts 34 clamped to the axle by means such as U-bolts 36. Fittings 32 are keyed to parts 34, to prevent turning, as shown in Figure 2. Between fittings 32, the tension element 26 is housed in a rigid conduit 38 slidably supported and journaled at its ends in parts 34, the rigid conduit 38 and the two fittings 32 having interengaging spiral or cam-shaped ends so that turning the rigid conduit 38, by means of its operating lever 40 connected to the usual operating linkage 42, serves to force the two flexible conduits 30 apart lengthwise of the tension element 26, to apply the two brakes. Since the rigid conduit 38 can float lengthwise, the pressures on the two brakes are balanced or equalized against each other.

Figure 4:
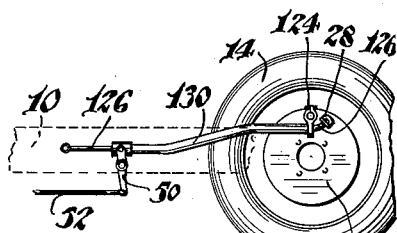
Figure 4 is a partial section corresponding to Figure 3, but showing the operating mechanism supported by the chassis frame instead of by the opposite brake.

The arrangement of Figure 4 differs from that described above in that the tension element 126 is connected at its rear end to the chassis frame 10 instead of to the other brake, and the flexible conduit 130 is slid lengthwise thereof to apply the brake by means such as a lever 50 pivoted on the frame and operated by the usual linkage 52.

While two illustrative embodiments have been described in detail, it is not my intention to limit the scope of the invention to those particular embodiments, or otherwise than by the terms of the appended claims.

I claim:

1. Brake mechanism comprising, in combination, a wheel having a brake, a support, a tension element supported by said support and having its end mounted on said brake, an applying device carried by the brake adjacent the end of the tension element, and a compression conduit sleeved on the tension element and movable along the tension element lengthwise to operate said applying device.

2. Brake mechanism comprising, in combination, a wheel having a brake, a support, a tension element supported by said support and having its end fixedly secured to said brake, an applying device carried by the brake adjacent the end of the tension element, and a compression conduit sleeved on the tension element and movable along the tension element lengthwise to operate said applying device.

3. Brake mechanism comprising, in combination, a wheel having a brake, a tension element held at its ends and one of whose ends is at said brake, and a flexible compression conduit sleeved on the tension element and shiftable lengthwise thereon to apply the brake.

4. Brake mechanism comprising, in combination, a wheel having a brake, a tension element held at its ends and one of whose ends is at said brake, a flexible compression conduit sleeved on the tension element and shiftable lengthwise thereon, and a brake-applying lever engaged by the end of said conduit and operated by lengthwise movement thereof.

5. Brake mechanism comprising, in combination, two wheels having brakes, a tension element held at its ends and extending between the two brakes, conduits sleeved on said element, and means for forcing said conduits lengthwise of the tension element to apply the brakes.

6. Brake mechanism comprising, in combination, two wheels having brakes, an applying device for each brake, a tension element held at its ends and extending between the two brakes, conduits sleeved on said element and engaging respectively said applying devices, and means for forcing said conduits apart lengthwise along the tension element to apply the brakes.

7. A vehicle having a wheel with a brake, together with a chassis frame, and comprising, in combination therewith, a flexible tension element held at its opposite ends by the brake and the chassis frame, an applying device for the brake adjacent the brake end of said element, and a compression conduit sleeved on said element and movable lengthwise of said element to operate the applying device.

8. A vehicle having a wheel with a brake, together with a chassis frame, and comprising, in combination therewith, a flexible tension element held at its opposite ends by the brake and the chassis frame, an applying device for the brake adjacent the brake end of said element, a compression conduit sleeved on said element and movable lengthwise of said element and engaging the applying device, and means for sliding the conduit lengthwise along the tension element to operate the applying device.

9. Brake mechanism comprising, in combination, two wheels having brakes, an applying device for each brake, a tension element held at its ends and extending between the two brakes, conduits sleeved on said element and engaging respectively said applying devices, and means for forcing said conduits apart lengthwise along the tension element to apply the brakes, said means being permitted to float in a direction lengthwise of the tension element in order to balance the pressures on the brakes through said conduits.

10. A vehicle having a wheel with a brake together with a chassis frame, and comprising in combination therewith a backing plate for said brake secured against rotation relative to said chassis frame about the axis of said wheel, a flexible tension element secured at one end to said backing plate, an applying device for the brake adjacent to said backing plate, and a compression conduit sleeved on said tension element, connected to said applying device, and movable lengthwise of said element to operate the applying device.

11. Brake mechanism comprising, in combination, a wheel having a brake, a tension element held at its ends and one of whose ends is at said brake, a flexible compression conduit sleeved on the tension element, and means for shifting said compression conduit lengthwise on said tension element to apply the brake.

In testimony whereof, I have hereunto signed my name.

ROY S. SANFORD.